Sept. 18, 1956

F. J. BYDALEK 2,763,313

LOCK NUT MOUNTED ON A LEAF SPRING OR SIMILAR MEMBER

Filed Aug. 10, 1953

INVENTOR.
Floyd J. Bydalek
BY
Seegert & Schwalbach
Att'ys

United States Patent Office 2,763,313
Patented Sept. 18, 1956

2,763,313
LOCK NUT MOUNTED ON A LEAF SPRING OR SIMILAR MEMBER

Floyd J. Bydalek, Milwaukee, Wis., assignor to Milwaukee Gas Specialty Company, Milwaukee, Wis., a corporation of Wisconsin Application August 10, 1953, Serial No. 373,091

6 Claims. (Cl. 151—41.7)

This invention relates to improvements in mounting and locking means, and more particularly to mounting and locking means for adjustment screws.

In certain devices, for example precision controls, precise adjustment of the various parts is a critical factor, and unless the proper adjustment is maintained, proper operation cannot result. Devices of this type are of compact and delicate construction, and of necessity utilize parts which have relatively small mass and are light in weight.

In devices of the aforementioned character it is often desirable to mount an adjustment screw on a member of relatively thin cross-section, for example on a leaf spring. This presents a problem, since it is impossible to obtain substantial thread engagement between a leaf spring and an adjustment screw due to the thin cross-section of the leaf. Moreover, commercially available lock nuts are too heavy and too bulky for use in devices of compact precision construction.

One type of adjustment screw mounting and locking means for leaf members is shown in the copending application for patent of Adolph J. Hilgert, case 8, Serial No. 350,365, filed April 22, 1953. In the locking means shown in the Hilgert application, portions of the leaf spring surrounding the adjustment screw are stamped out to provide a pair of tongues which engage the screw from diametrically opposite sides. This type of locking means is unsatisfactory because the coaction of the screw threads with the locking tongues causes an undesirable deflection of the leaf spring.

With the above in mind, it is a principal object of the present invention to provide improved mounting and locking means which is of particular utility in mountng a threaded member, for example an adjustment screw, on a member of thin cross-section, for example a leaf spring, and for locking said screw in a selected position of adjustment relative to the member on which it is mounted.

Another object of the invention is to provide an improved mounting and locking means which is characterized by its lightness in weight and its relatively small mass, and which is therefore well adapted for use in precision controls.

Another object of the invention is to provide an improved mounting and locking means of the character described which exerts no substantial deflecting stresses on the member to which it is fixed.

Another object of the invention is to provide an improved mounting and locking means which is further characterized by its simple and inexpensive construction, ease of manufacture, and positive operation.

Other objects and advantages of the invention will appear as the description proceeds, reference being had to the accompanying drawing showing one form of the invention, and in which like characters of reference indicate the same parts in all of the views.

Figure 1:
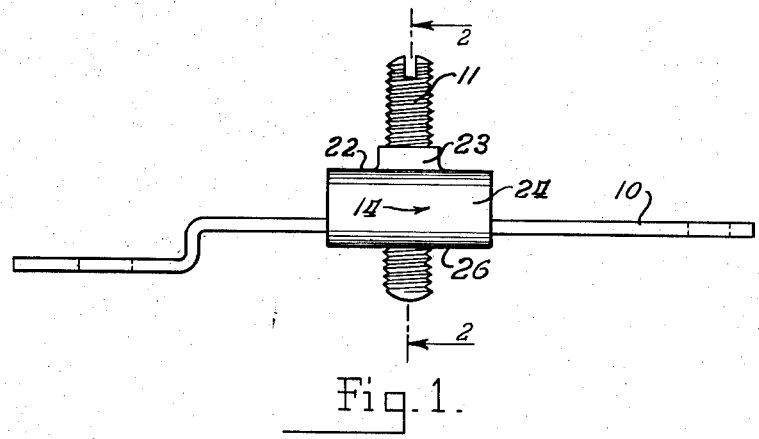
Figure 1 is a side elevational view of the improved mounting and locking means applied to a leaf spring and having an adjustment screw mounted and locked therein.

Referring more particularly to the drawing, the numeral 10 indicates a support member of thin cross-section, for example a leaf spring, on which a threaded member, for example an adjustment screw 11, is to be mounted and locked in operative position. The leaf spring 10 and adjustment screw 11 may form a part of a control device.

The improved clamping and locking means comprises a friction washer 13 and a mounting member 14 fixedly secured to the leaf spring 10 adjacent an aperture 12 in said spring, said aperture having a diameter substantially larger than the diameter of the screw 11. The friction washer 13 is preferably of rectangular conformation and has a pair of opposite parallel edge walls 15 and 16 (Figure 2), as well as flat parallel faces 17 and 18, and an untapped bore 19 (see Figure 4). The washer 13 is positioned with its surface 18 flat against one side of the leaf spring 10, with its edge walls 15 and 16 contiguous with the parallel opposite edges 20 and 21 respectively of the leaf, and with its bore 19 in registry with the aperture 12 of said leaf. The washer 13 is made of any suitable elastic material, preferably a synthetic linear superpolymer of a diamine and a dibasic acid, a commercial example of which is nylon.

Figure 2:
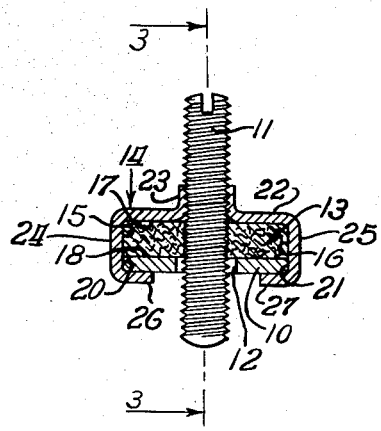
Figure 2 is a transverse vertical sectional view taken along the line 2—2 of Figure 1.
Figure 4:
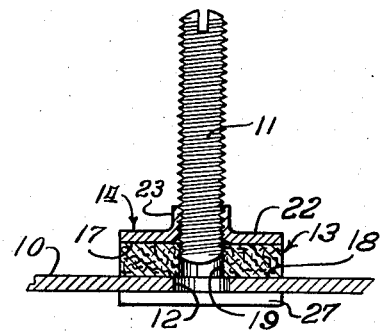
Figure 4 is a fragmentary longitudinal sectional view similar to Figure 3 and showing the adjustment screw being threaded into the elastic friction washer of the improved mounting and locking means.

The mounting member 14 may take the form of a metal stamping which is generally C-shaped in cross-section, as shown in Figure 2. The member 14 has a flat intermediate portion 22 which preferably lies flat against the surface 17 of the washer 13 and is formed with an outwardly directed collar or tubular extension 23 having a threaded bore in registry with the bore 19 of the washer 13, as shown in Figure 4. The bore of the collar 23 is adapted to threadedly receive the adjustment screw 11. The mounting member 14 has opposite end portions 24 and 25 which extend around the edge walls 15 and 16 of the washer 13 and the edges 20 and 21 of the leaf 10, and terminate in inturned flanges 26 and 27 which engage the underside of the leaf 10 to clamp the member 14 and washer 13 in operative position.

Figure 3:
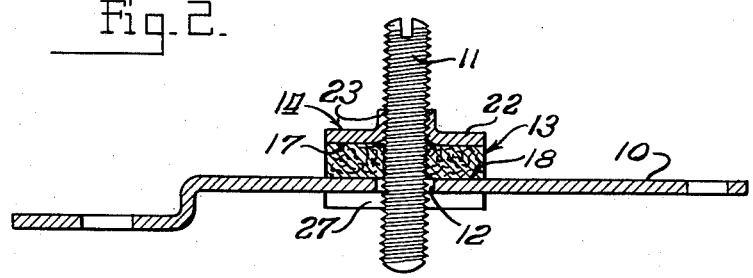
Figure 3 is a longitudinal vertical sectional view taken along the line 3—3 of Figure 2.

In use of the improved mounting and locking device, the adjustment screw 11, or other threaded element, is threaded through the bore of the collar 23 as shown in Figure 4, and thence through the untapped bore 19 of the friction washer 13. The diameter of the bore 19 is smaller than the root diameter of the thread in the collar 23, so that the surface of the bore 19 is engageable by the threads of the screw 11 when the latter is threaded through said collar. This engagement causes displacement of the material of the washer 13 due to the impression of the thread of the screw into the bore surface of said washer, and as a result, a compressive pressure is built up within the washer 13 causing the latter to grip the screw 11, mounting member 14 and support or leaf spring 10 to lock the same in a selected position. The screw 11 is turned in to operative position, for example to the position shown in Figures 1 to 3, and remains locked in this position until subsequently readjusted.

The improved mounting and locking device is light in weight and compact, and it exerts no substantial deflecting stresses on the leaf 10. In addition, the improved device is simple and inexpensive in construction, and well adapted for mass production manufacture.

While the invention has particular utility in mounting and locking adjustment screws on members of thin section, such as leaf springs, the invention is not limited to use with members of thin cross-section.

The form of the invention selected for illustration is for the purpose of disclosure only, and is not intended to define the limits or scope of the invention. Various changes and modifications may be made without departing from the spirit of the invention, and all of such changes are contemplated as may come within the scope of the claims.

What is claimed as the invention:

1. A device for mounting and locking a threaded element on a support, comprising: a member provided with a threaded portion for receiving said threaded element; means for securing said member to said support with said threaded portion spaced from said support; and a body of elastic locking material interposed between the threaded portion of said member and said support and held in position by securement of said member to said support, said elastic body including a portion projecting laterally relative to the axis of said threaded portion into the path of said threaded element and having a surface portion engageable by the threads of said element when the latter is threaded through said threaded portion, said engagement causing displacement of said locking material due to the impression of the thread of said element into said surface portion, whereby said material grips said element, member and support to lock the same in selected relative positions.

2. A device for mounting and locking a threaded element on a support having spaced edge portions, comprising: a member provided with a threaded portion for receiving said threaded element; a body of elastic locking material interposed between the threaded portion of said member and said support; and clamping means on said member embracing said elastic body and engaging the edge portions of said support to secure said member and body to said support, said elastic body including a portion projecting laterally relative to the axis of said threaded portion into the path of said threaded element and having a surface portion engageable by the threads of said element when the latter is threaded through said threaded portion, said engagement causing displacement of said locking material due to the impression of the thread of said element into said surface portion, whereby said material grips said element, member and support to lock the same in selected relative positions.

3. A device for mounting and locking a threaded element on a support having spaced edges, comprising: a C-shaped mounting member having an intermediate portion provided with a threaded bore for receiving said threaded element, and said intermediate portion being spaced from said support; and a body of elastic locking material interposed between the intermediate portion of said member and said support, said member having opposite end portions which extend around said elastic body and said edges of the support and clamp said body and member to said support, said elastic body including a portion projecting laterally relative to the axis of said threaded bore into the path of said threaded element and having a surface portion engageable by the threads of said element when the latter is threaded through said threaded bore, said engagement causing displacement of said locking material due to the impression of the thread of said element into said surface portion, whereby said material grips said element, mounting member and support to lock the same in selected relative positions.

4. A device for mounting and locking an adjustable threaded element on a leaf member, comprising: a friction washer of elastic material positioned flat against one side of said leaf and having an untapped bore therethrough; and a C-shaped mounting member having an intermediate portion provided with a threaded bore and a coaxial internally threaded collar projecting outwardly from the margin of said bore for receiving said threaded element, said mounting member having opposite end portions which extend over the edges of said washer and leaf and engage the opposite side of said leaf to fixedly clamp said member and washer to said leaf, the untapped bore of said friction washer being positioned in registry with the threaded bore of said mounting member and being dimensioned to provide interference with the thread of said threaded element to require internal displacement of the material of said washer when traversed by said element, whereby said washer grips said element, leaf member and mounting member to lock the same in selected relative positions.

5. In combination: a substantially flat leaf formed with an aperture and having opposite side edges; a substantially flat friction washer of elastic material positioned flat against one side of said leaf and having an untapped bore in registry with the aperture of said leaf, said washer also having opposite side edges contiguous with the side edges of said leaf; a C-shaped mounting member having a flat intermediate portion overlying said friction washer and formed with a threaded bore in registry with the washer bore, said mounting member also having opposite end portions extending over the contiguous edges of said washer and leaf and engaging the other side of said leaf to fixedly clamp said member and washer to said leaf; and an adjustment screw threaded through the bore of said member and extending through the bore of said washer and the aperture of said leaf, the untapped bore of said washer being dimensioned to provide interference with the thread of said adjustment screw and to require internal displacement of the material of said washer when traversed by said screw, whereby said screw, leaf and mounting member are gripped by said washer and locked thereby in selected relative positions.

6. A device for mounting and locking a threaded adjustment element on a thin leaf spring support free of means capable of distorting such thin support, comprising, a member provided with a threaded portion for receiving said threaded element, means on said member for positioning the same in a given position with respect to said support so that said threaded portion is spaced therefrom, and a body of elastic locking material interposed between the threaded portion of said member and said support, said elastic body including a portion projecting laterally relative to the axis of said threaded portion into the path of said threaded element and having a surface portion engageable by the thread of said element when the latter is threaded through said threaded portion, said engagement causing displacement of said locking material due to the impression of the thread of said element into said surface portion, whereby said material is caused to perform the dual function of gripping said member and support to secure the former to the latter and of gripping said element to lock the same in any desired position.

References Cited in the file of this patent

UNITED STATES PATENTS

| 815,550 | Parkinson | Mar. 20, 1906 |
| 1,765,158 | Henry et al. | June 17, 1930 |
| 2,381,936 | Sargent | Aug. 14, 1945 |
| 2,403,496 | Breedlove | July 9, 1946 |

FOREIGN PATENTS

| 483,089 | Great Britain | Apr. 12, 1938 |
| 532,830 | Great Britain | Jan. 31, 1941 |
| 549,377 | Great Britain | Nov. 18, 1942 |